United States Patent [19]

Schutt et al.

[11] 4,411,550
[45] Oct. 25, 1983

[54] TORQUE TRANSMITTING COUPLING

[75] Inventors: Peter Schutt, Lochgau; Martin Bernhardt, Bietigheim; Klaus Nitsche, Erligheim; Horst Grindler, Freudental; Hans-Joachim Hofmann, Remshalden, all of Fed. Rep. of Germany

[73] Assignee: Durr-Dental GmbH & Co., KG, Bietigheim, Fed. Rep. of Germany

[21] Appl. No.: 297,367

[22] Filed: Aug. 28, 1981

[30] Foreign Application Priority Data

Aug. 29, 1980 [DE] Fed. Rep. of Germany ....... 3032537

[51] Int. Cl.³ .......................... B25G 3/28; F16B 3/00; F16B 7/00; F16D 1/00
[52] U.S. Cl. .................................................... 403/358
[58] Field of Search ................................. 403/356, 358

[56] References Cited

U.S. PATENT DOCUMENTS

| 1,185,340 | 5/1916 | Mogan | 403/358 |
| 2,197,631 | 4/1940 | Doran | 403/356 |
| 2,287,454 | 6/1942 | Scharnberg | 403/358 |
| 2,501,505 | 3/1950 | Garrison | 403/358 |
| 2,807,485 | 9/1957 | Seibert | 403/356 |
| 3,002,773 | 10/1961 | Hallgren | 403/356 |
| 3,574,365 | 4/1971 | Bailey | 403/358 X |

Primary Examiner—Wayne L. Shedd
Attorney, Agent, or Firm—Robert E. Burns; Emmanuel J. Lobato; Bruce L. Adams

[57] ABSTRACT

In a torque transmitting coupling between a cylindrical shaft and a female member having a bore to receive the shaft, the shaft has a secant face and the female member has a connecting bolt bore which intersects the shaft bore and faces the secant face of the shaft. A connecting bolt in the bolt bore of the female member has a secant face which tightly engages the secant face of the shaft. In one embodiment, the shaft axis, secant faces of the shaft and bolt and the bolt bore are all parallel. In another embodiment the axis of the bolt bore is inclined at a small angle to the secant face, the bolt being of wedge form. A screw extending through a hole in the female member and screwed into a tapped hole in the bolt is rotatable to move the bolt axially and thereby wedge the secant face of the bolt against the secant face of the shaft. The secant faces of the shaft and bolt may have intermeshing longitudinally extending serrations.

7 Claims, 7 Drawing Figures

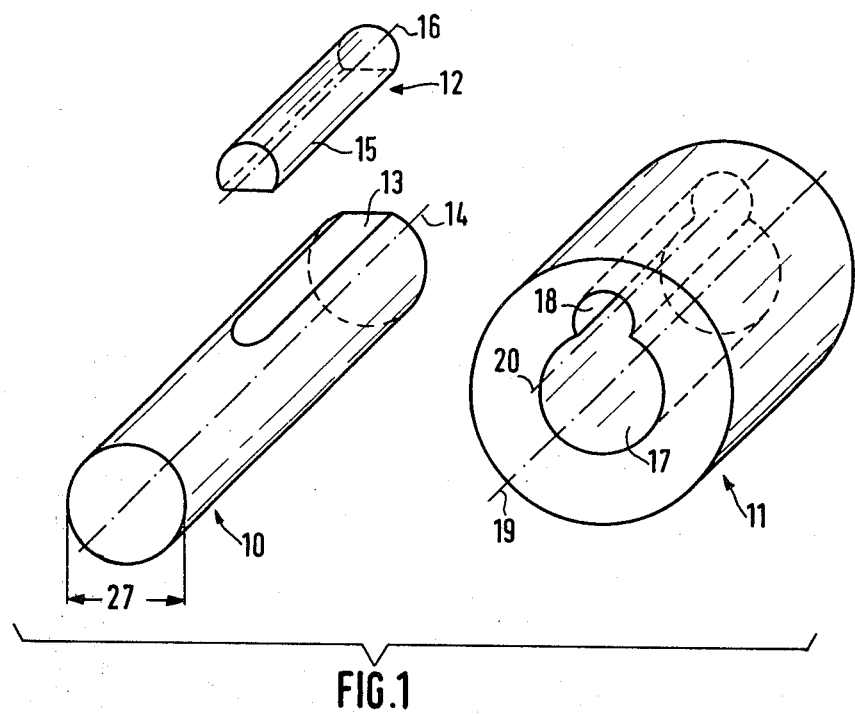
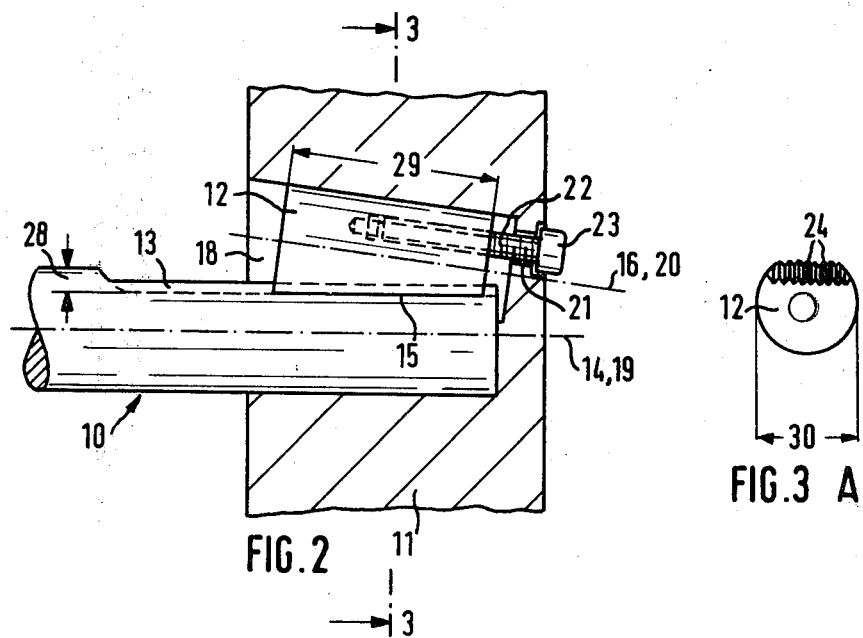
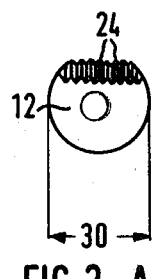
FIG.1
FIG.2  FIG.3 A

TORQUE TRANSMITTING COUPLING

FIELD OF INVENTION

The present invention relates to a torque transmitting coupling between a cylindrical shaft and second part coaxial with the shaft.

BACKGROUND OF THE INVENTION

Many such couplings are known. Thus there are many different forms of key couplings, spring couplings, clamp couplings, pin couplings in which a pin extends through the second part and the shaft and gear couplings and couplings with spined or specially profiled shafts.

Especially easy to produce are couplings in which the shaft is inserted in a cylindrical bore in the second part and then a hole is bored to receive a connecting bolt. In such case the connecting bolt can be a cross pin, a tangential pin, or a longitudinal pin. With a cross pin, the hole for the connecting pin is bored through the shaft and the second member perpendicular to the longitudinal axis of the shaft and the cross pin is inserted into the hole. With a tangential pin, a hole for the pin is likewise bored perpendicular to the longitudinal axis of the shaft but so that the longitudinal axis of the hole lies tangential to the shaft. The tangential pin is then inserted in the hole bored in the shaft and the second part. With a longitudinal pin, a hole for the pin is bored parallel to the longitudinal axis of the shaft generally from the end of the shaft so that the axis of the hole coincides with a generatrix of the shaft. The longitudinal pin is inserted in this hole so that it lies half in the shaft and half in the second part. Cross pins and tangential pins can suitably be used only when the dimensions of the second part are not too large since otherwise an excessively long hole must be bored. The longitudinal pin can only be used when the end of the shaft is not covered by another part. This requirement is frequently not fulfilled. As the aforementioned single pins cannot be used in many cases, a more complicated kind of fastening is required. These other kinds of fastening no longer have only a simple bore to receive the connecting bolt in an otherwise unworked part to be connected but the connecting bolt and the shaft or the other part have also plane surfaces for making the connection. Frequently used are rectangular springs which lie in grooves in the shaft and the second part. Somewhat simpler on the other hand is a form which is partly round. For this purpose connecting springs are known which lie in a groove in the shaft and in the portion which lies in the groove have a rectangular cross section fitting the shape of the groove. In the part extending out of the groove the spring has, on the other hand, a circular cross section. This rounded part of the spring engages in a round groove in the art having a bore. The latter part thus has a cylindrical bore for the shaft and a likewise cylindrical bore for the connecting spring, the two bores intersecting with one another. Other torque transmitting couplings between a cylindrical shaft and a part having a bore are more complicated to produce than that described above. In particular, end gear couplings or couplings with splined or profiled shafts are expensive to produce.

SUMMARY OF THE INVENTION

The present invention is directed to the problem of providing a torque transmitting coupling between a cylindrical shaft and a part having a clyindrical bore for the shaft and a cylindrical bore for a fastening bolt with the two bores intersecting one another and with a connecting bolt in the bolt bore which is very simple to produce and can also be used when the part having the bores is of large dimensions.

In accordance with the invention, there is provided a torque transmitting coupling in which the shaft is provided with a secant face, the connecting bolt is part cylindrical with a secant face and the secant face of the shaft and secant face of the bolt lie tight against one another when the shaft is in the shaft bore and the connecting bolt is in the bolt bore of the female part of the coupling. With such a coupling, the cylindrical and plane faces required for the coupling are all easy to produce. The shaft bore and the bolt bore are drilled or bored while the shaft secant face and the bolt secant face are easily produced on the round part by milling or grinding. Only a cylindrical bolt without any other faces would be simpler. However, if the round bolt were to be used with a large female coupling part, only its use as a longitudinal key or pin would be possible. In such case the shaft would have to be provided with a longitudinally extending bore in its circumferential surface. If the bore can be produced from the end, this is no problem insofar as the bore need not be too long because of a long female coupling part. The provision of a longitudinal bore in the shaft is, however, difficult and often impossible when the bore must be provided in an intermediate portion of the shaft as when the female part of the coupling is positioned on an intermediate part and not at the end of the shaft. As compared with a torque transmitting coupling with a simple cylindrical coupling bolt, the coupling in accordance with the invention thus provides great flexibility of use. Compared with other torque transmitting couplings, the coupling in accordance with the invention is simpler to produce.

With a torque transmitting coupling in accordance with the invention, the secant face of the bolt can, for example, be parallel with or inclined to the longitudinal axis of the bolt. With a parallel bolt secant face and a shaft secant face which is parallel with the longitudinal axis of the shaft, the torque transmitting coupling provides a connection which is fixed in a radial direction but not in an axial direction. The advantages possessed by even this simple form of coupling in accordance with the invention have been described. Through the simple possibility of a wedge form and thereby both radial and axial security, the coupling in accordance with the invention attains highly important advantages over known torque transmitting couplings.

In order to attain the wedge action, several different possibilities are available. The most advantageous is for the shaft secant face and the bolt secant face to lie parallel to the shaft axis and for the longitudinal axis of the shaft bore and longitudinal axis of the bolt bore to be inclined relative to one another. In this case the shaft is subjected to no axial force in the tightening of the wedge other than frictional forces in mounting. With another possible form of embodiment in which the shaft secant face is inclined relative to the shaft axis, the shaft is subjected to such axial forces. Such wedge connection is not possible either with the simple cylindrical bolt nor with the connecting spring described above which in its lower part is of rectangular cross section and in its upper part is circular cross section. The heretofore known wedge connections require moreover, wedges with side faces at right angles to one another which leads to expensive production of the coupling compared with that of the present invention.

In order to achieve a torque transmitting coupling with wedge action in accordance with the present invention it is merely necessary to incline the bolt bore with respect to the shaft bore and to grind or machine the bolt secant face inclined to the bolt longitudinal axis. On the shaft, as already described, the shaft secant face ground or machined parallel to the shaft longitudinal axis.

With a torque transmitting coupling in accordance with the present invention, the connection between the cylindrical shaft and the female part of the coupling can, for example, be made with a press fit. If the coupling is produced with a wedge action, it is also possible to use a loose fit and to tighten the coupling by pushing or pulling the bolt in the bolt bore, for example with a screw. In this case it is not necessary to select a particularly close tolerance and nevertheless assure an absolutely secure torque transmitting coupling even with direction-changing forces as for example with the balance wheel of a crank shaft.

The bolt and shaft faces can for example be ground or milled smooth. However, it is especially advantageous when the shaft secant face and the bolt secant face have a serration permitting sliding in a longitudinal direction. This can be produced simply by machining with a thread milling machine. Through the provision of such teeth the shaft and the bolt are given a form which importantly contributes to the security of the coupling.

BRIEF DESCRIPTION OF DRAWINGS

The nature and advantages of the invention will be more fully understood from the following description of preferred embodiments shown by way of example in the accompanying drawings in which:

FIG. 1 is an exploded perspective view of a torque transmitting coupling in accordance with the present invention;

FIG. 2 is a longitudinal section through a torque transmitting coupling having a wedge form connecting bolt;

FIG. 3A is an end view of the connecting bolt shown in FIG. 3;

DESCRIPTION OF PREFERRED EMBODIMENTS

Figure 3:
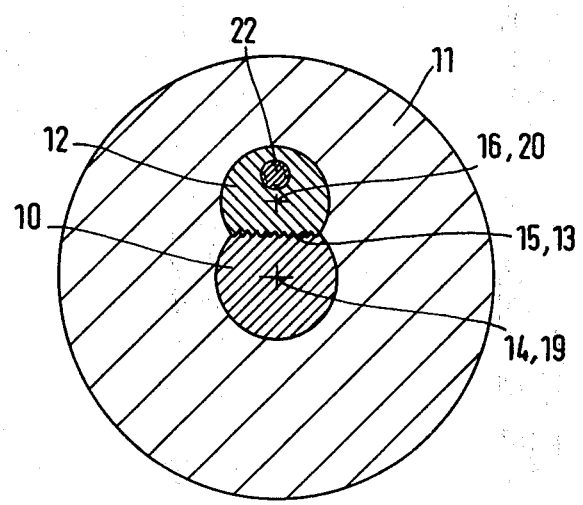
FIG. 3 is a cross section taken approximately on the line 3—3 in FIG. 2.

FIG. 1 is an exploded perspective view showing a shaft 10, a female part 11 and a connecting bolt 12 of a torque transmitting coupling in accordance with the invention. The otherwise cylindrical shaft has a secant face 13 which is parallel to the longitudinal axis 14 of the shaft. The originally cylindrical connecting bolt 12 has a corresponding secant face 15 which is parallel to the longitudinal axis 16 of the bolt. In the female part 11 of the coupling there is a cylindrical shaft bore 17 and a cylindrical bolt bore 18 of which the circular cross sections intersect one another. The longitudinal axis 19 of the shaft bore and the longitudinal axis 20 of the bolt bore are parallel to one another. In assembling the coupling, the shaft 10 is inserted in the shaft bore 17 of the female part 11 and turned so that the shaft secant face 13 faces the bolt bore 18. Then the connecting bolt 12 is inserted in the bolt bore 18 of the female part 11. The dimensions are so selected that the bolt secant face 15 and the shaft secant face 11 lie tight against one another. A torque transmitting coupling between the shaft 10 and the female part 11 is thereby attained. Examples of such torque transmitting couplings are the couplings between the shaft and a wheel hub or a crank shaft and a fly wheel. For example, a torque transmitting coupling in accordance with the invention is suitable for connecting the motor shaft with the fly wheel and crank shaft of a compressor such as that shown in our copending application Ser. No. 297360 filed Aug. 28, 1981 and corresponding to German patent application No. 30 32 518.9 filed Aug. 29, 1980.

Instead of only one secant face 13 the shaft can have one or more other secant faces around its circumference. Correspondingly the female part 11 is provided with several bolt bores 18 for connecting bolts 12. Such a coupling with two or more connecting bolts 12 is appropriate for use when a high torque is to be transmitted.

With the shaft 10 shown in FIG. 1, the secant face 13 is provided at one end of the shaft. However, it is also possible that on a long shaft the female part 11 must be secured to an intermediate portion of the shaft rather than at its end. In this case the shaft secant face 13 will be provided on that portion of the shaft where the female part 11 is to be secured. When the shaft secant face 13 is as long as the connecting bolt 12, the coupling is assembled by first positioning the connecting bolt 12 with its secant face 15 on the shaft secant face 13 and then sliding the female part 11 over the shaft and the connecting bolt. The connection is preferably a press fit.

With the coupling according to FIG. 1, longitudinal axes 19 and 20 of the shaft bore 17 and bolt bore 18 are parallel to one another. The shaft secant face 13 and the bolt secant face 15 are parallel to these axes when the coupling is assembled. Such torque transmitting coupling provides a radial and torque transmitting connection. An axial connection is also possible when the longitudinal axes of the connecting bolt, shaft and shaft secant face are no longer parallel but are inclined to one another. For example the longitudinal axis 16 of the bolt aand the longitudinal axis 14 of the shaft can be parallel to one another while the shaft secant face 13 is inclined to these axes. In this manner it is possible to provide a connection which is secure in an axial direction if the shaft secant face 13 is so inclined to the longitudinal axis 14 of the shaft and thereby to the longitudinal axis 19 of the shaft bore that upon possible falling out of the shaft there is produced a tightening of the wedge form connecting bolt. A similar connection which is secure in an axial direction is possible when the longitudinal axis 16 of the bolt and also the shaft secant face 13 are inclined with respect to the longitudinal axis 14 of the shaft.

In FIG. 2 there is shown in longitudinal section an embodiment in which the shaft secant face 13 is parallel to the longitudinal axis 14 of the shaft but the longitudinal axis 16 of the bolt is inclined with respect to the longitudinal axis of the shaft. In this case there are no forces other than friction forces which act on the bolt to tend to slide it in an axial direction. In FIG. 2 the shaft 10 extends into a blind hole in the female part 11. The bolt bore 18 is inclined to the longitudinal axis 19 of the shaft bore. In the bolt bore 18 there is inserted a connecting bolt 12 of which the bolt secant face 15 is inclined with respect to the longitudinal axis 16 of the bolt. The female part 11 further has a screw hole 21 through which there extends, as a tension means for the connecting bolt 12, a machine screw 22 which is screwed into a tapped hole in the connecting bolt 12 and has a head 23 which bears on the edge of the hole 21. The tapped hole in the connecting bolt 12 is parallel to the longitudinal axis of the bolt. By rotation of the machine screw 22, the connecting bolt 12 is drawn in the bolt hole 18 whereby because of the inclination of the axis 20 of the bolt bore and the axis 19 of the shaft bore, the connecting bolt presses with its secant face 15 on the shaft secant face 13.

The angle of inclination of the bolt bore axis to the axis of the shaft is such that the wedge action of the connecting bolt 12 is self-locking. Hence, even if the machine screw 22 should loosen, the connecting bolt 12 will remain in place. It can, however, be loosened by partially unscrewing the screw 22 and then tapping gently on the head of the screw. For example the angle of inclination is between 1° and 7° being preferably about 5°.

Figure 5:
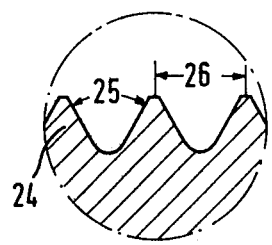
FIG. 5 is an enlarged cross section through the teeth of the shaft secant face of the shaft shown in FIG. 2.
Figure 4:
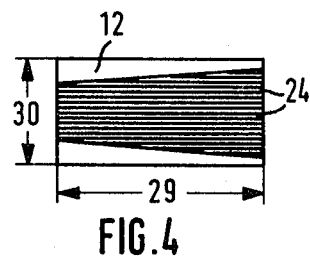
FIG. 4 is a bottom plan view of the wedge form connecting bolt of FIG. 2.

In order to contribute to the self-locking connection between the shaft secant face 13 and the bolt secant face 15, both faces are provided with serrations or teeth which extend in a longitudinal direction. The teeth or serrations are shown in an enlarged cross sectional view in FIG. 5. The tooth angle 25 is, for example, about 60°, the tooth spacing 26 is about 1.5 mm and the tooth depth about 1 mm. The teeth 24 are also shown in FIGS. 3, 3A and 4. Teeth or serrations may likewise be provided on the shaft secant face 13 and bolt secant face 15 of the embodiment of the invention shown in FIG. 1 and thereby improve the locking characteristics of the coupling.

An an example of a torque transmitting coupling in accordance with the present invention the shaft 10 may have a diameter 27 of about 25 mm. The shaft secant face 13 is cut with a depth of about 3 mm. The connecting bolt 12 has a length 29 of about 35 mm and a diameter of about 17.5 mm. The bolt secant face 15 is about 2 mm deep at one end and about 5 mm deep at the other end. The serrations of the shaft secant face 13 and bolt secant face 15 are produced with a thread milling machine.

Figure 6:
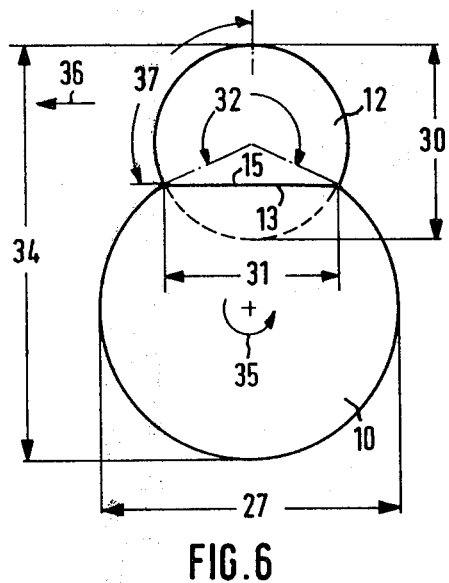
FIG. 6 is a schematic representation of the forces acting on the connecting bolt.
Figure 7:
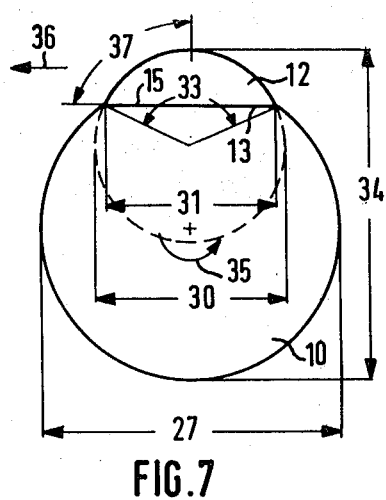
FIG. 7 is a schematic representation similar to FIG. 6 but with other dimensions of the connecting bolt.

In FIG. 6 and 7 there are shown schematically in section a shaft 10 with a connecting bolt 12 with the shaft secant face and bolt secant face engaged with one another. Both shafts have the same diameter 27 and both connecting bolts 12 have the same diameter 30. Also the width 31 of the shaft secant face 13 and bolt secant face 15 is the same in both cases. However, in the case of FIG. 1, the original cylindrical bolt of a diameter 30 is so provided with the bolt secant face 15 of a width 31 that it embraces an angle 32 greater than 180°. Under the same conditions the connecting bolt according to FIG. 12 is so machined that is embraces an angle 33 less than 180°. The advantage of the solution according to FIG. 7 is that the shaft 10 and connecting bolt 12 occupy a lesser overall height 34, less than in the case of FIG. 6 with its higher connecting bolt 12. Thus when a small overall dimension is desired, a solution according to FIG. 7 with an included angle 33 less than 180° is selected.

The solution according to FIG. 6, however, has an important advantage. When a screw is used to tension the connecting bolt 12 as illustrated in FIG. 2, a connecting bolt according to FIG. 7 is not sufficiently large to provide room for the screw. In this case the solution according to FIG. 6 is selected. Moreover, the force transmission by a connecting bolt 12 on the female part 11 of the coupling is more favorable than with a connecting bolt of the kind shown in FIG. 7. A counter-clockwise torque acts on the shaft 10 in FIGS. 6 and 7 as represented by the arrow 35. With a locking engagement between the shaft secant face and the bolt secant face, the bolt will be pushed towards the left and exert a force 36 on the female part 11 of the coupling. This force acts on the whole left face 37 of the connecting bolt 12 of FIG. 6 or FIG. 7. With a connecting bolt with a larger circumference and thereby a greater left face 37 according to claim 6, the surface loading of the bore with the same torque transmitted by the shaft 10 is less than with the connecting bolt 12 according to FIG. 7 which has a smaller circumference and a smaller left face 37. The female part 11 of the coupling, for example a wheel hub or fly wheel, is frequently made of cast material and hence does not have a high load carrying capacity. Thus where high torque is to be transmitted, a coupling according to FIG. 6 is more advantageous than that according to FIG. 7 and is hence to be selected insofar as the dimension 34 permits.

While preferred embodiments of the invention have been illustrated by way of example in the drawings and are herein particularly described, it will be understood that the invention is subject to many variations and is in no way limited to the illustrated embodiments.

What we claim is:

1. A torque transmitting coupling comprising a female member having a central first cylindrical bore to receive a shaft and a second cylindrical bore which receives a fastening bolt, said second cylindrical bore intersecting said first cylindrical bore at an acute angle, a cylindrical shaft received snugly in said first cylindrical bore, and having a secant face parallel to the axis of the shaft, a cylindrical fastening bolt received snugly in said second cylindrical bore and having a secant face parallel to and engaging said secant face of said shaft, and means moving said cylindrical fastening bolt axially in said second cylindrical bore and thereby wedging said secant face of said bolt tightly against said secant face of said shaft.

2. A torque transmitting coupling according to claim 1, in which the acute angle at which said second cylindrical bore intersects said first cylindrical bore is between approximately 1° and 7°.

3. A torque transmitting coupling according to claim 1, in which said fastening bolt has an axial tapped hole therein and said means for moving said fastening bolt axially in said second cylindrical bore comprises a machine screw screwed in said tapped hole in said bolt.

4. A torque transmitting coupling according to claim 3, in which said female member has a hole smaller than said second bore in line with said tapped hole in said fastening bolt, said screw having a head and extending through said hole in the female member and into said tapped hole in said fastening bolt.

5. A torque transmitting coupling according to claim 1, in which said female member has an abutment portion against which an end of said shaft abuts and in which engagement of said fastening bolt with said shaft as said fastening bolt is moved toward wedging position tends to move said shaft toward said abutment portion of said female member and thereby precisely positions said shaft axially relative to said female member.

6. A torque transmitting coupling according to claim 1, in which said secant face of said shaft and said secant face of said fastening bolt has intermeshing longitudinally extending serrations.

7. A torque transmitting coupling according to claim 6, in which said serrations in cross section have the configuration of gear teeth.

* * * * *